United States Patent
Aruga

(10) Patent No.: US 9,522,545 B2
(45) Date of Patent: Dec. 20, 2016

(54) OPTICAL SCANNING APPARATUS AND IMAGE FORMING APPARATUS INCLUDING THE OPTICAL SCANNING APPARATUS

(71) Applicant: CANON KABUSHIKI KAISHA, Tokyo (JP)

(72) Inventor: Daisuke Aruga, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/666,972

(22) Filed: Mar. 24, 2015

(65) Prior Publication Data

US 2015/0273862 A1    Oct. 1, 2015

(30) Foreign Application Priority Data

Mar. 26, 2014 (JP) ................................. 2014-064483

(51) Int. Cl.
  *B41J 2/45* (2006.01)
  *F16F 1/18* (2006.01)
  *G03G 15/043* (2006.01)

(52) U.S. Cl.
  CPC .................. *B41J 2/451* (2013.01); *F16F 1/18* (2013.01); *G03G 15/0435* (2013.01)

(58) Field of Classification Search
  CPC .......... B41J 2/451; G03G 15/0435; F16F 1/18
  USPC ........ 347/230, 241, 244, 245, 256, 257, 263
  See application file for complete search history.

(56) References Cited

U.S. PATENT DOCUMENTS

| | | | |
|---|---|---|---|
| 7,782,353 B2* | 8/2010 | Kato | G02B 26/123 347/134 |
| 2014/0211288 A1* | 7/2014 | Ohta | G02B 26/125 359/205.1 |

FOREIGN PATENT DOCUMENTS

JP    2010-237537 A    10/2010

* cited by examiner

*Primary Examiner* — Anh T. N. Vo
(74) *Attorney, Agent, or Firm* — Canon U.S.A. Inc., IP Division

(57) ABSTRACT

A leaf spring includes a first pressing portion that presses a reflection mirror supported by a mirror support, and an engagement portion that engages with an engagement portion provided on a housing. In a first state in which the engagement portions are engaged with each other, the first pressing portion presses the reflection mirror so that the reflection mirror is urged against the mirror support. When a state of the leaf spring is being changed to the first state from a second state in which the engagement portions are not engaged with each other, the leaf spring comes into contact with the engagement portion provided on the housing and rotates such that the engagement portion provided on the housing serves as a fulcrum.

10 Claims, 11 Drawing Sheets

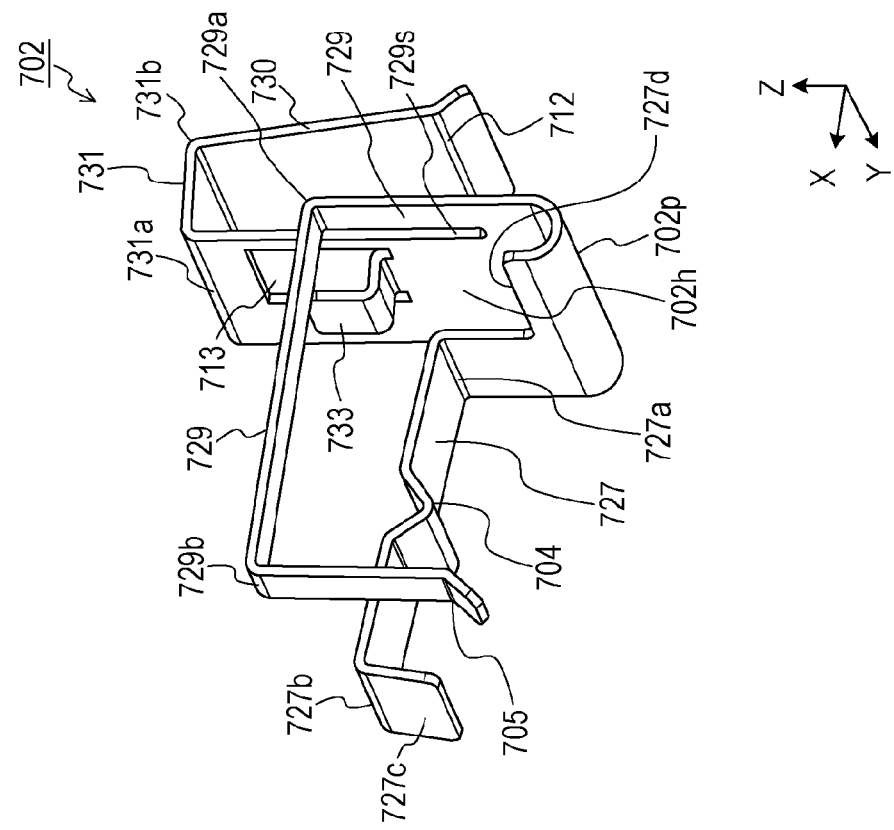
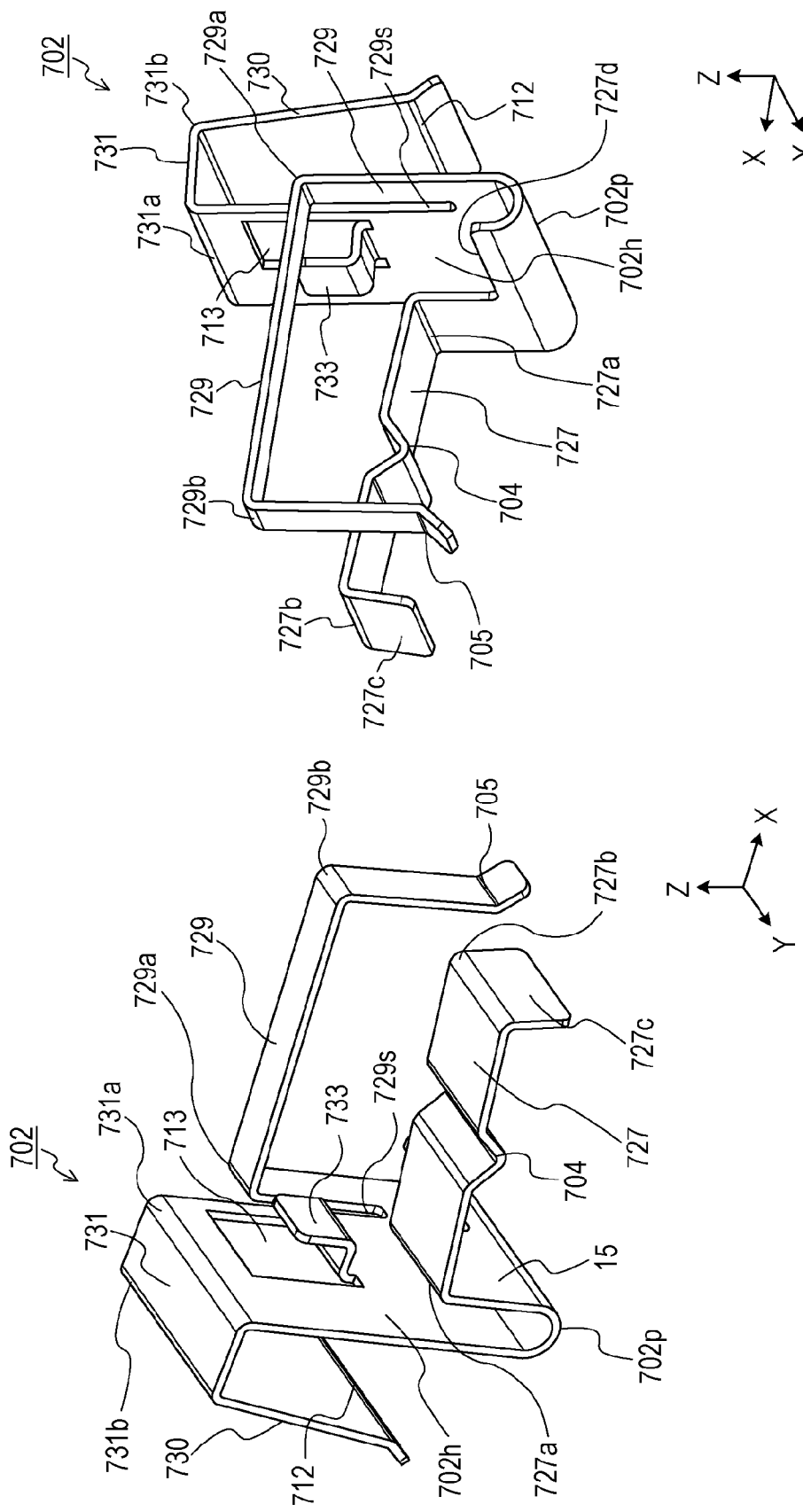

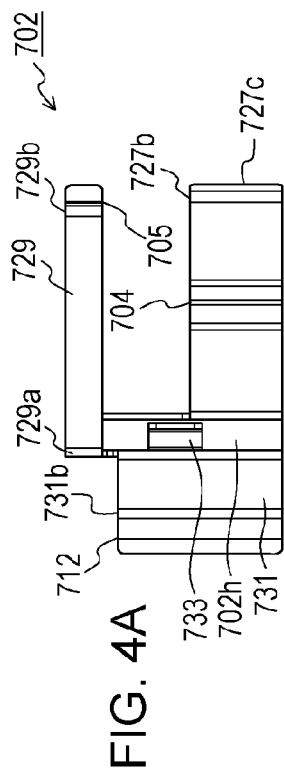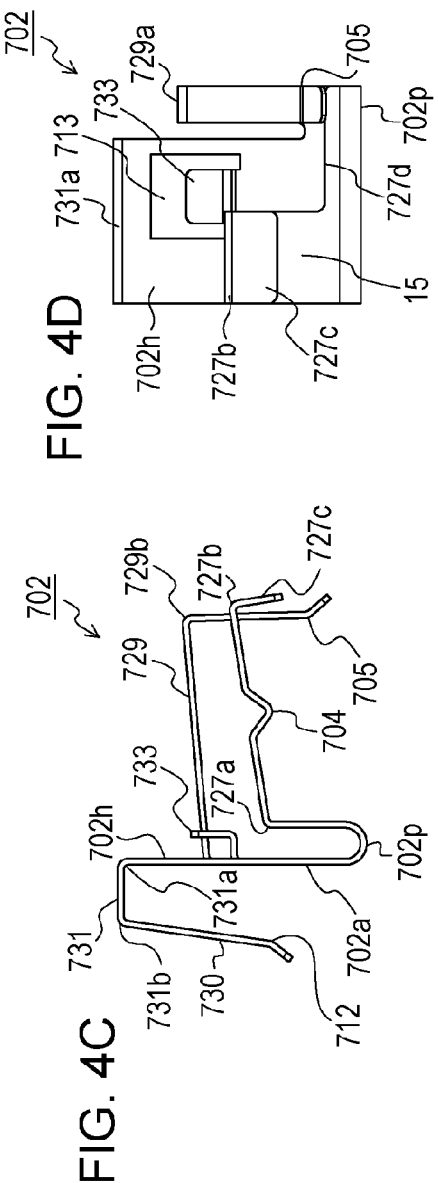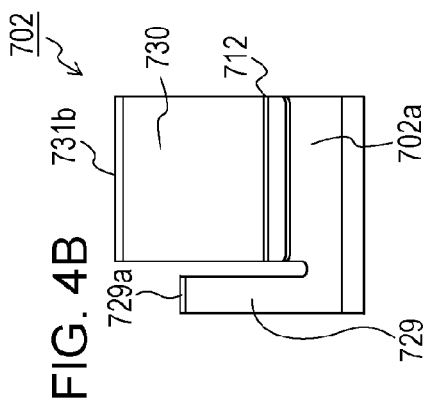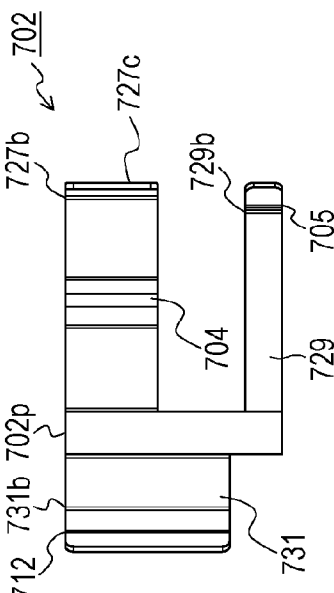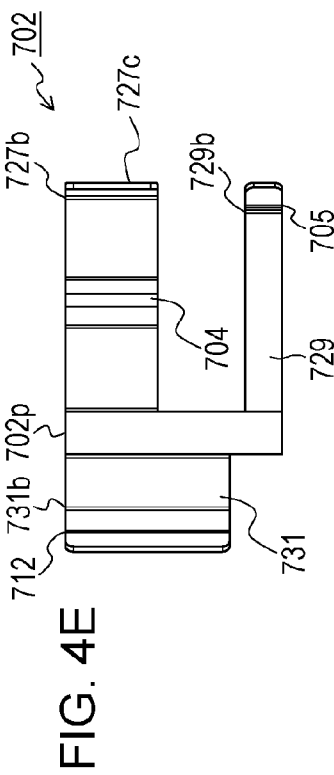
FIG. 4A
FIG. 4B
FIG. 4C
FIG. 4D
FIG. 4E

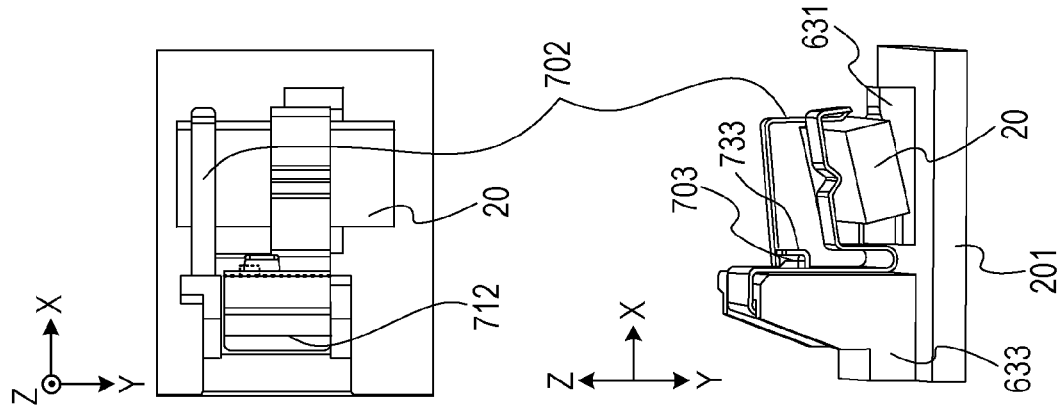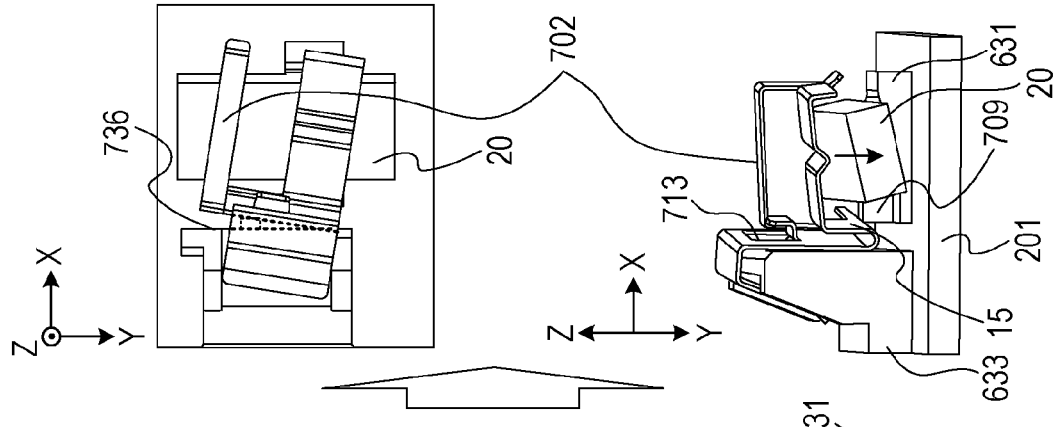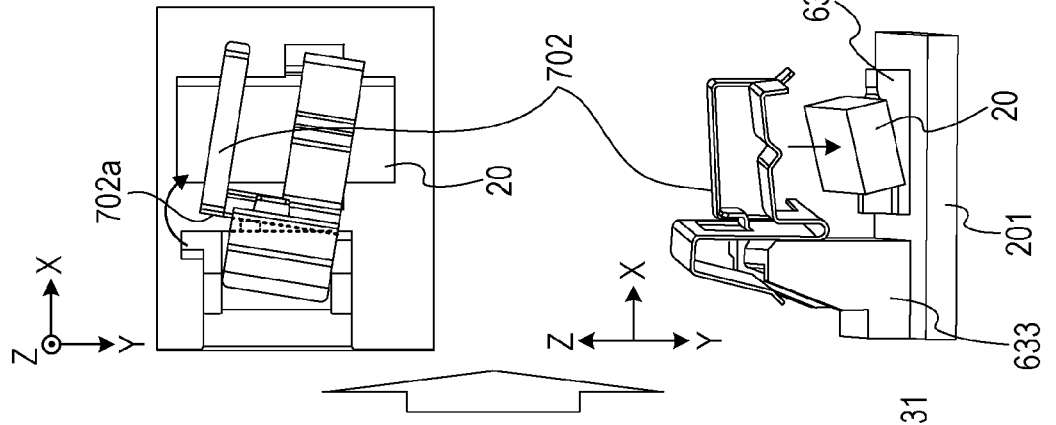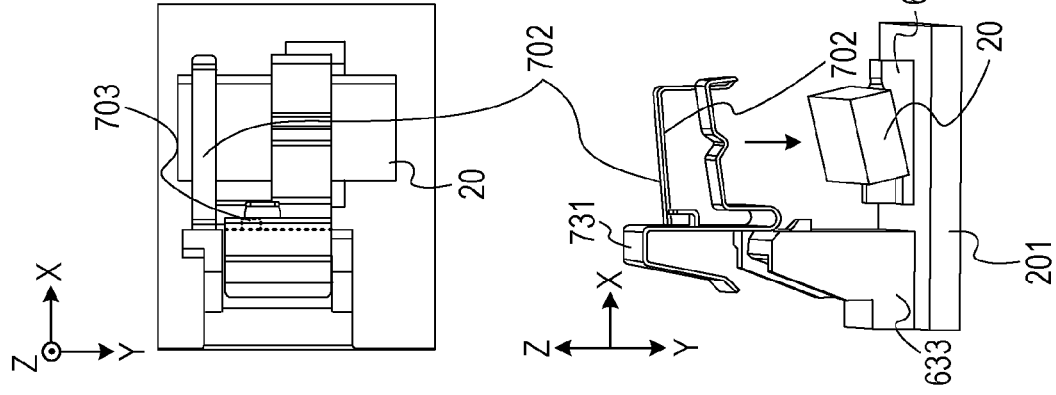

OPTICAL SCANNING APPARATUS AND IMAGE FORMING APPARATUS INCLUDING THE OPTICAL SCANNING APPARATUS

BACKGROUND OF THE INVENTION

Field of the Invention

The present invention relates to an optical scanning apparatus and an image forming apparatus including the optical scanning apparatus.

Description of the Related Art

In an electrophotographic image forming apparatus, a photoconductor (hereinafter referred to as a photoconductor drum for convenience) is irradiated with a light beam emitted from an optical scanning apparatus, so that a latent image is formed on the photoconductor drum. The latent image is developed and visualized by using toner, so that a toner image is formed. The toner image formed on the photoconductor drum is transferred onto a recording medium, and fixed to the recording medium by a fixing device which applies heat and pressure to the toner image. The recording medium on which an image is formed is discharged to the outside of the apparatus.

The optical scanning apparatus includes a light source, a rotating polygon mirror that is rotated to deflect a light beam emitted from the light source, and lenses and mirrors that guide the light beam deflected by the rotating polygon mirror to the photoconductor drum. These components are accommodated and retained in an optical box (housing). FIG. 9A is a schematic sectional view, taken along a plane that passes through the center of a leaf spring 1702a, illustrating a structure in which a commonly used optical component is retained. A reflection mirror 20, which is an optical component, is retained in an optical box 201 by a pressing force applied by the leaf spring 1702a, which is elastically deformable. In this structure, a first pressing portion 1705a presses a mirror edge portion 708, which have a low strength, of the reflection mirror 20. Therefore, there is a risk that the mirror edge portion 708 will be worn, chipped, or cracked. If powder or small pieces generated as a result of the mirror being worn, chipped, or cracked adhere to the mirror, the reflectance of the mirror decreases. As a result, the intensity of the light beam guided to the photoconductor drum will become lower than the desired intensity according to the design.

Japanese Patent Laid-Open No. 2010-237537, for example, proposes a structure for preventing the reflection mirror 20 from being worn, chipped, or cracked due to the leaf spring 1702a. In this structure, the leaf spring is inserted to a predetermined location while a holder portion is bent by an assembly jig such that a reflection-mirror-pressing portion of the leaf spring is compressed. Since the reactive force generated when the holder portion is bent is received by the assembly jig, the leaf spring may be prevented from coming into contact with the reflection mirror 20 in the process of attaching the leaf spring. Even when the leaf spring comes into contact with the reflection mirror 20, the reflection mirror 20 receives only a small pressing force. Therefore, the leaf spring may be attached without causing the mirror edge portion of the reflection mirror 20 to receive a force (or a stress) that causes wearing, chipping, or cracking thereof. A structure illustrated in FIG. 9B, for example, has also been proposed in which a first pressing portion 1705b of a leaf spring 1702b presses a mirror flat surface 710 instead of the mirror edge portion 708.

In the structure illustrated in FIG. 9B, the stress applied to the mirror edge portion 708 of the reflection mirror 20 in the state in which the leaf spring 1702b is attached is smaller than that in the structure illustrated in FIG. 9A. However, as illustrated in FIG. 9C, when the leaf spring 1702b is pressed downward to insert the leaf spring 1702b, owing to the reactive force of a third pressing portion 704 that presses a mirror reflective surface 706, the leaf spring 1702b is pressed in the direction of arrow 711 in FIG. 9C. Also, as illustrated in FIG. 9C, the leaf spring 1702b is tilted by a large amount due to an engagement portion 703. As a result, the leaf spring 1702b comes into contact with the mirror edge portion 708. To prevent the mirror edge portion 708 form being worn, chipped, or cracked, it is desirable to prevent the leaf spring 1702b and the mirror edge portion 708 from coming into contact with each other in a period from start to completion of the process of attaching the leaf spring 1702b.

SUMMARY OF THE INVENTION

In light of the above-described circumstances, the present invention provides a structure for reducing the occurrence of chipping or cracking of an optical member in a period from start to completion of a process of attaching a leaf spring at a predetermined location.

Structures according to aspects of the present invention will now be described.

(1) According to an aspect of the present invention, an optical scanning apparatus includes a light source configured to emit a light beam; a deflector configured to deflect the light beam emitted from the light source so that a photoconductor is scanned with the light beam; an optical member configured to guide the light beam deflected by the deflector to the photoconductor; a housing configured to accommodate the light source, the deflector, and the optical member and including an engagement portion and an optical member supporting portion configured to support the optical member; and a leaf spring including a pressing portion configured to press the optical member supported by the optical member supporting portion, and including an engagement portion configured to engage with the engagement portion provided on the housing, the pressing portion presses the optical member so that the optical member is urged against the optical member supporting portion in a first state in which the engagement portion provided on the leaf spring is engaged with the engagement portion provided on the housing. When a state of the leaf spring is being changed to the first state from a second state in which the engagement portion provided on the leaf spring is not engaged with the engagement portion provided on the housing, the leaf spring comes into contact with the engagement portion provided on the housing and rotates such that the engagement portion provided on the housing functions as a fulcrum.

(2) According to another aspect of the present invention, an image forming apparatus includes a photoconductor; the optical scanning apparatus according to above item (1), the optical scanning apparatus irradiating the photoconductor with the light beam to form an electrostatic latent image; a developing unit that develops the electrostatic latent image formed by the optical scanning apparatus to form a toner image; and a transfer unit that transfers the toner image formed by the developing unit onto a recording medium.

Further features of the present invention will become apparent from the following description of exemplary embodiments with reference to the attached drawings.

BRIEF DESCRIPTION OF THE DRAWINGS

FIGS. 3A to 3D illustrate the structure of a leaf spring according to the embodiment.

FIGS. 4A to 4E illustrate the structure of the leaf spring according to the embodiment.

FIGS. 7A to 7F illustrate the way in which the leaf spring is attached to an optical box and the way in which the leaf spring is rotated.

DESCRIPTION OF THE EMBODIMENTS

An embodiment of the present invention will be described with reference to the drawings. In the following description, the direction of the rotational axis of a rotating polygon mirror described below, which serves as a deflector, is defined as a Z-axis direction. In addition, a main scanning direction, which is the direction in which a light beam is scanned, or the longitudinal direction of a reflection mirror is defined as an X-axis direction, and the direction perpendicular to the X axis and the Z axis is defined as a Y-axis direction.

Attachment of Leaf Spring According to Related Art

Figure 9A:
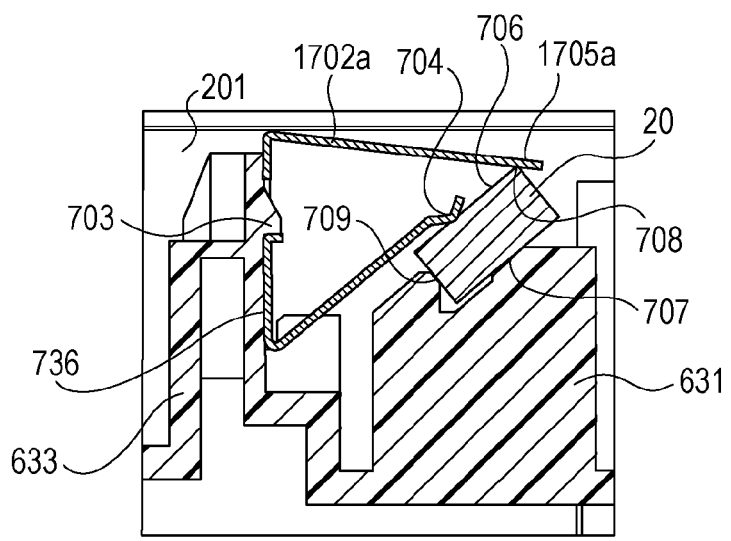
FIGS. 9A to 9C illustrate leaf springs and a manner in which a leaf spring is attached to an optical box according to the related art.

For comparison with the embodiment described below, a leaf spring according to the related art and the manner in which the leaf spring is attached will be described. As illustrated in FIG. 9A, the reflection mirror 20, which serves as an optical component, is retained by a pressing force applied by the leaf spring 1702a, which is elastically deformable, in the resin optical box 201, which serves as a housing and is made of a resin. From the viewpoint of work efficiency and assembly cost, the leaf spring 1702a is configured to engage with engagement portion 703 provided on the optical box 201 instead of being fixed with screws. A portion of the optical box 201 that is near the engagement portion 703 receives part of the repulsive force generated when the reflection mirror 20 is pressed, so that the leaf spring 1702a is retained in a certain position. The leaf spring 1702a includes the third pressing portion 704 and the first pressing portion 1705a. The third pressing portion 704 presses the mirror reflective surface 706 toward a first mirror seat 707 provided on the optical box 201. The first pressing portion 1705a presses the mirror edge portion 708 in a direction such that the reflection mirror 20 is pressed against the first mirror seat 707 and a second mirror seat 709. Since the reflection mirror 20 is pressed in two directions by the third pressing portion 704 and the first pressing portion 1705a, the vibration resistance of the reflection mirror 20 may be increased, and the risk of separation of the reflection mirror 20 due to an impact of being dropped or vibration may be reduced.

However, this structure has the following problems. That is, since the first pressing portion 1705a presses the mirror edge portion 708, which have a low strength, of the reflection mirror 20, there is a risk that the mirror edge portion 708 will be chipped or cracked. In particular, optical components such as the reflection mirror 20 and lenses are often made of glass. In such a case, the mirror edge portion 708 is easily chipped or cracked even by a slight contact with other components. When the first pressing portion 1705a comes into contact with the mirror edge portion 708 and chipping or cracking of the mirror edge portion 708 occurs, pieces of the mirror edge portion 708 may fall downward in the optical box 201 and block an optical path of light. In particular, when dust or the like including the pieces of the mirror edge portion 708 adheres to an optical component included in an optical scanning apparatus, the dust blocks the light, and the amount of light that reaches a surface of a photoconductor is reduced. Accordingly, it becomes difficult to form a desired image. When the dust unevenly adheres to an optical component, there is a risk that an image having streaks will be formed on a print medium.

Figure 9B:
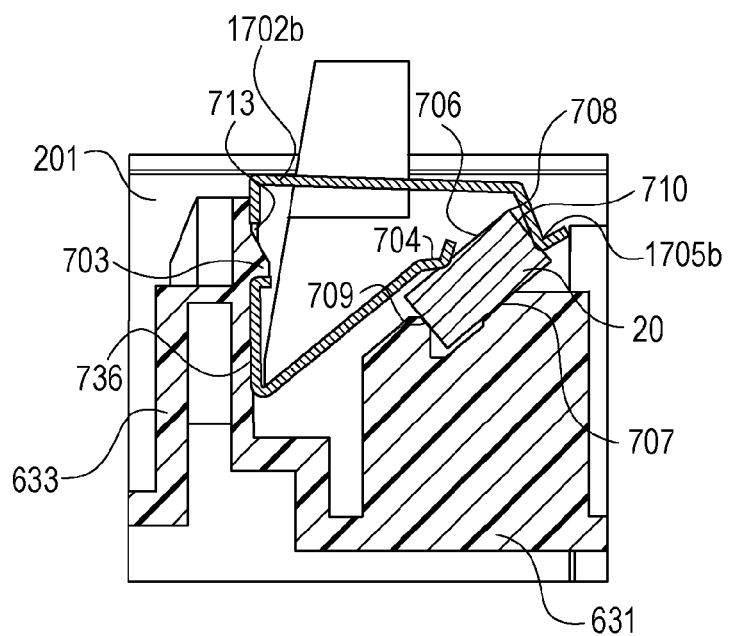

The structure illustrated in FIG. 9B has been proposed as a structure in which the leaf spring is not in contact with the mirror edge portion of the reflection mirror when the leaf spring is attached at a predetermined location. In the structure illustrated in FIG. 9B, the first pressing portion 1705b, which corresponds to the first pressing portion 1705a illustrated in FIG. 9A, presses the mirror flat surface 710 instead of the mirror edge portion 708. In the structure illustrated in FIG. 9B, in the state in which the leaf spring 1702b is attached, the leaf spring 1702b is not in contact with the mirror edge portion 708. However, as described above with reference to FIG. 9C, the leaf spring 1702b and the mirror edge portion 708 come into contact with each other in the period from start to completion of the process of attaching the leaf spring 1702b.

Embodiments

Structure of Image Forming Apparatus

Figure 1:
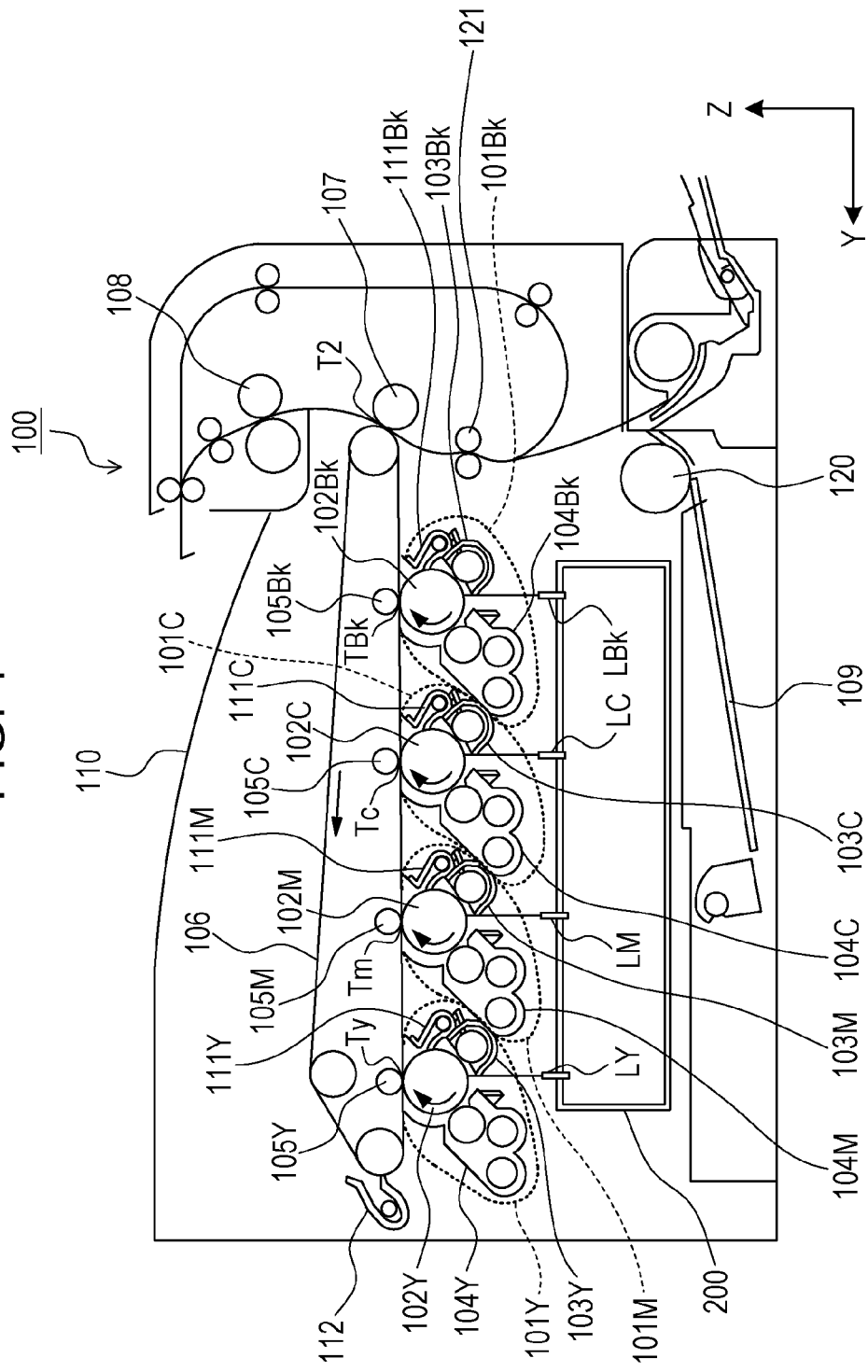
FIG. 1 illustrates the structure of an image forming apparatus according to an embodiment.

FIG. 1 is a schematic sectional view of an electrophotographic image forming apparatus 100 according to an embodiment. The image forming apparatus 100 illustrated in FIG. 1 includes four image forming units 101Y, 101M, 101C, and 101Bk that form toner images of respective colors, which are yellow (Y), magenta (M), cyan (C), and black (Bk). In the following description, the characters Y, M, C, and Bk, which represent the respective colors, are omitted unless they are necessary. The image forming units 101 include respective photoconductor drums 102, which serve as photoconductors. The photoconductor drums 102 are arranged at different locations in a horizontal direction (Y-axis direction). Each image forming unit 101 further includes a charging device 103 which charges the corresponding photoconductor drum 102; a developing device 104 that develops an electrostatic latent image formed on the photoconductor drum 102 with toner; and a cleaning device 111 that removes toner that remains on the photoconductor drum 102 from the photoconductor drum 102 (photoconductor).

Each image forming unit 101 is formed as a process cartridge in which the photoconductor drum 102, the charging device 103, the developing device 104, and the cleaning device 111 are integrated together. The process cartridge is a replaceable unit that is detachably attachable to the image forming apparatus 100. The image forming units 101Y, 101M, 101C, and 101Bk are referred to also as process cartridges 101Y, 101M, 101C, and 101Bk.

The main section of the image forming apparatus 100 includes an optical scanning apparatus 200, transfer rollers 105Y, 105M, 105C, and 105Bk, an intermediate transfer belt 106, a sheet feeding unit 109, a sheet discharge unit 110, a transfer roller 107, and a fixing device 108. The intermediate transfer belt 106 rotates in the direction shown by the arrow (counterclockwise) in FIG. 1. The optical scanning apparatus 200 is disposed below the photoconductor drums 102 in the direction of gravity (negative Z-axis direction). Alternatively, the optical scanning apparatus 200 may instead be configured to emit light toward the photoconductor drums 102 from above in the direction of gravity (positive Z-axis direction).

Next, an image forming process will be described. The optical scanning apparatus 200 emits light beams LY, LM, LC, and LBk with which the photoconductor drums 102Y, 102M, 102C, and 102Bk, which are charged by the charging devices 103Y, 103M, 103C, and 103Bk, respectively, are irradiated. When the photoconductor drums 102Y, 102M, 102C, and 102Bk are irradiated with (exposed to) the light beams, electrostatic latent images are formed thereon.

The developing device 104Y develops the electrostatic latent image formed on the photoconductor drum 102Y by using yellow toner. The developing device 104M develops the electrostatic latent image formed on the photoconductor drum 102M by using magenta toner. The developing device 104C develops the electrostatic latent image formed on the photoconductor drum 102C by using cyan toner. The developing device 104Bk develops the electrostatic latent image formed on the photoconductor drum 102Bk by using black toner.

The yellow toner image formed on the photoconductor drum 102Y is transferred onto the intermediate transfer belt 106, which serves as an intermediate transfer member, by the transfer roller 105Y at a transfer section Ty. In a region between the transfer section Ty and a charging section of the charging device 103Y in the rotational direction of the photoconductor drum 102Y, the cleaning device 111Y collects the toner that has not been transferred onto the intermediate transfer belt 106 and that has remained on the photoconductor drum 102Y. The magenta toner image formed on the photoconductor drum 102M is transferred onto the intermediate transfer belt 106 by the transfer roller 105M at a transfer section Tm. In a region between the transfer section Tm and a charging section of the charging device 103M in the rotational direction of the photoconductor drum 102M, the cleaning device 111M collects the toner that has not been transferred onto the intermediate transfer belt 106 and that has remained on the photoconductor drum 102M.

The cyan toner image formed on the photoconductor drum 102C is transferred onto the intermediate transfer belt 106 by the transfer roller 105C at a transfer section Tc. In a region between the transfer section Tc and a charging section of the charging device 103C in the rotational direction of the photoconductor drum 102C, the cleaning device 111C collects the toner that has not been transferred onto the intermediate transfer belt 106 and that has remained on the photoconductor drum 102C. The black toner image formed on the photoconductor drum 102Bk is transferred onto the intermediate transfer belt 106 by the transfer roller 105Bk at a transfer section TBk. In a region between the transfer section TBk and a charging section of the charging device 103Bk in the rotational direction of the photoconductor drum 102Bk, the cleaning device 111Bk collects the toner that has not been transferred onto the intermediate transfer belt 106 and that has remained on the photoconductor drum 102Bk. Each of the cleaning devices 111 according to the present embodiment includes a blade that comes into contact with the corresponding photoconductor drum 102, and causes the blade to scrape off the toner that remains on the photoconductor drum 102 to collect the residual toner.

The toner images that have been transferred onto the intermediate transfer belt 106 are conveyed to a transfer section T2 by the rotation of the intermediate transfer belt 106 in the direction shown by the arrow. At this time, recording sheets contained in the sheet feeding unit 109 are fed one at a time by a feed roller 120 and conveyed to the transfer section T2 by conveying rollers 121. The position of each recording sheet that is fed by the feed roller 120 and the timing at which the recording sheet is conveyed to the transfer section T2 are adjusted by the conveying rollers 121, and the recording sheet is supplied to the transfer section T2 so that the recording sheet comes into contact with the toner images formed on the intermediate transfer belt 106. Thus, the feed roller 120 and the conveying rollers 121 function as a conveying unit that conveys the recording sheet from the sheet feeding unit 109 toward the sheet discharge unit 110. The path along which the recording sheet is conveyed from the sheet feeding unit 109 to the sheet discharge unit 110 corresponds to a conveying path.

When the toner images that have been transferred onto the intermediate transfer belt 106 and the recording sheet that has been conveyed by the conveying rollers 121 reach the transfer section T2, a transfer voltage is applied to the transfer roller 107, so that the toner images are transferred from the intermediate transfer belt 106 to the recording sheet. The recording sheet to which the toner images have been transferred at the transfer section T2 is conveyed to the fixing device 108. The fixing device 108 heats the recording sheet while conveying the recording sheet, so that the toner images are fixed to the recording sheet. Then, the recording sheet to which the toner images have been fixed is discharged to the sheet discharge unit 110. Thus, the image forming units 101Y, 101M, 101C, and 101Bk, the intermediate transfer belt 106, and the transfer roller 107 function as an image forming unit disposed between the sheet feeding unit 109 and the sheet discharge unit 110 in the Z-axis direction.

The image forming apparatus 100 includes a cleaning device 112 disposed between the transfer section T2 and the transfer section Ty in the rotational direction of the intermediate transfer belt 106. The cleaning device 112 includes a blade that comes into contact with the intermediate transfer belt 106, and causes the blade to scrape off the toner that remains on the intermediate transfer belt 106. Thus, the cleaning device 112 removes the toner that has not been transferred onto the recording sheet at the transfer section T2 and that has remained on the intermediate transfer belt 106.

Figure 2A:
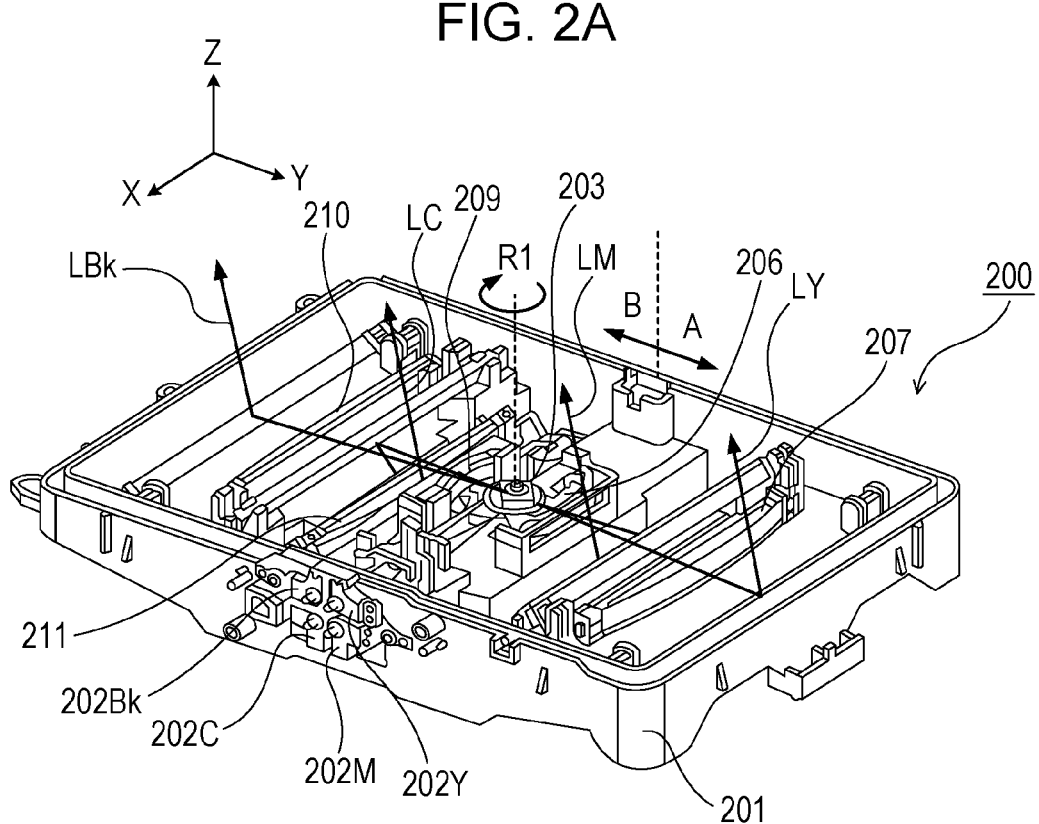
FIGS. 2A and 2B illustrate the structure of an optical scanning apparatus according to the embodiment.
Figure 2B:
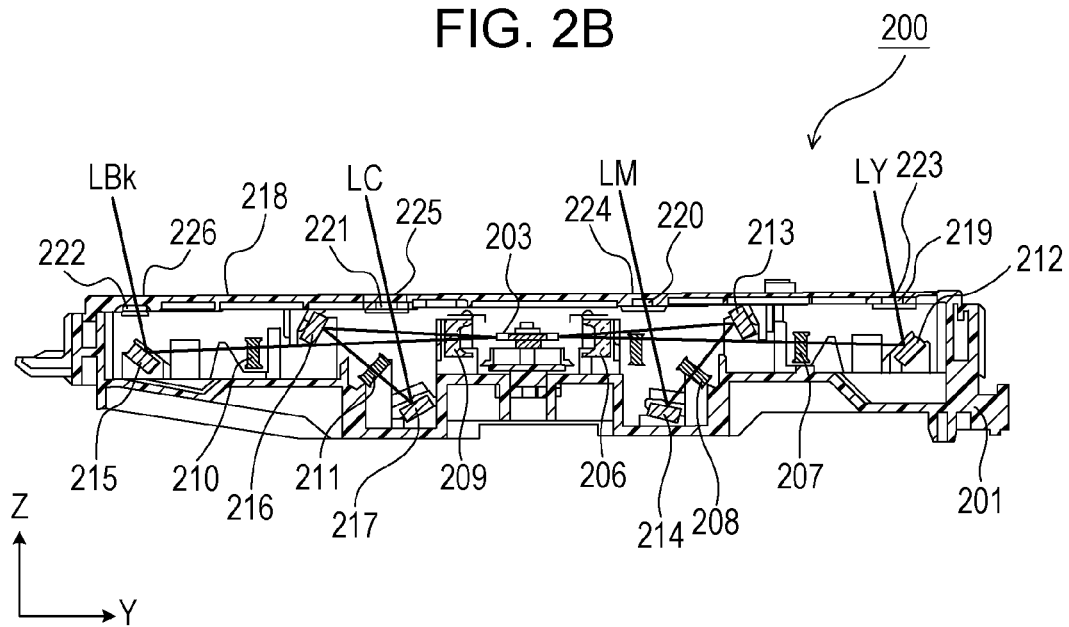
Figure 3C:
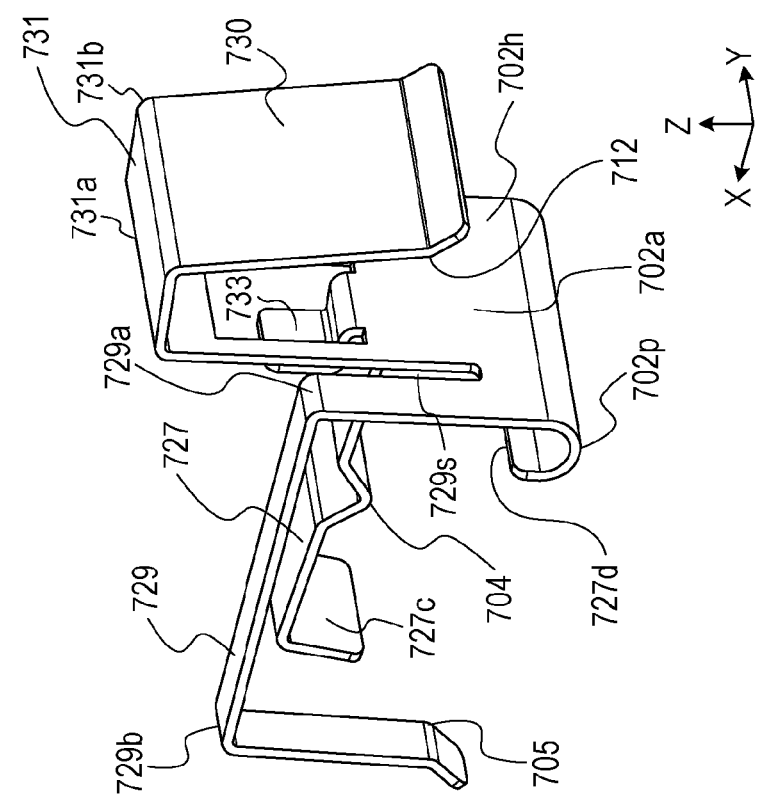
Figure 3D:
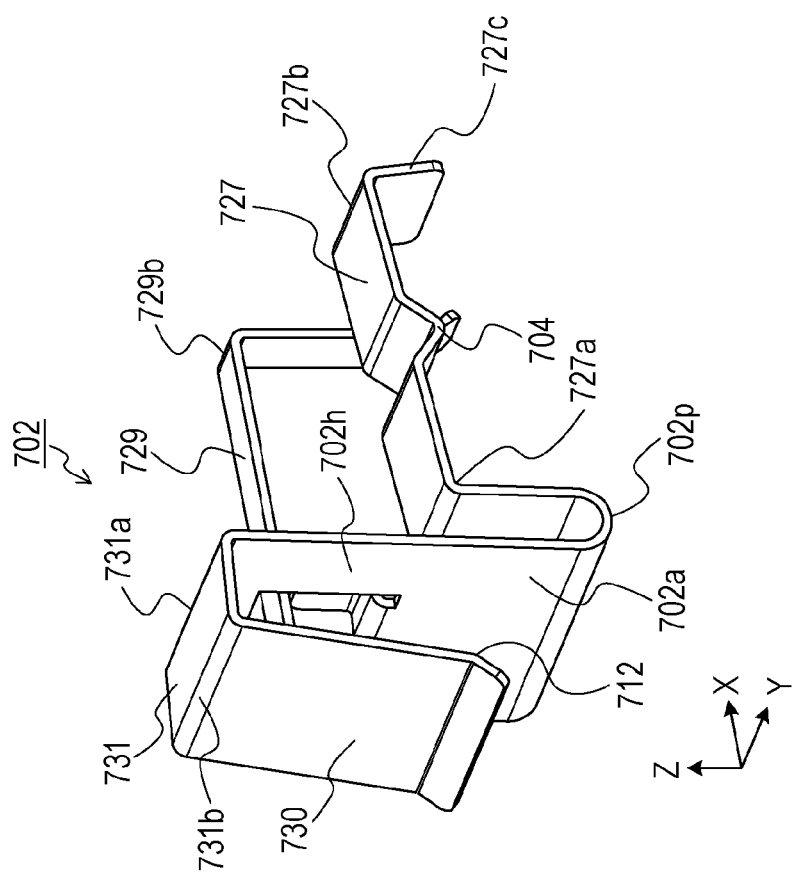

In the structure described below, the above-described image forming apparatus 100 may be a monochrome image forming apparatus which includes a single photoconductor drum or an image forming apparatus in which toner images formed on multiple photoconductor drums are directly transferred onto a recording medium. Structure of Optical Scanning Apparatus Next, the optical scanning apparatus 200 will be described. FIG. 2A is a perspective view illustrating the structure of the optical scanning apparatus 200, and FIG. 2B is a sectional view of the optical scanning apparatus 200. As illustrated in FIG. 2A, light source units 202Y, 202M, 202C, and 202Bk are attached to an outer wall of the optical box 201 (housing) of the optical scanning apparatus 200. The light source unit 202Y emits the light beam LY with which the photoconductor drum 102Y is irradiated, and the light source unit 202M emits the light beam LM with which the photoconductor drum 102M is irradiated. The light source unit 202C emits the light beam LC with which the photoconductor drum 102C is irradiated, and the light source unit 202Bk emits the light beam LBk with which the photoconductor drum 102Bk is irradiated. The light source units 202Y, 202M, 202C, and 202Bk are arranged close to each other.

Here, a plane that is orthogonal to the rotational axis of a rotating polygon mirror 203 and extends through the rotating polygon mirror 203 is defined as an imaginary plane. The light beam LY emitted from the light source unit 202Y and the light beam LBk emitted from the light source unit 202Bk are incident on a reflective surface of the rotating polygon mirror 203 along optical paths that obliquely extend from the upper side of the imaginary plane in the direction of gravity (from the positive side in the Z-axis direction). The light beam LC emitted from the light source unit 202C and the light beam LM emitted from the light source unit 202M are incident on a reflective surface of the rotating polygon mirror 203 along optical paths that obliquely extend from the lower side of the imaginary plane in the direction of gravity (from the negative side in the Z-axis direction). As illustrated in FIG. 2A, the rotating polygon mirror 203 is disposed at the center of the optical box 201, and includes four reflective surfaces. In the image forming process, the rotating polygon mirror 203 is rotated around a rotational axis R1 shown by the dashed line in FIG. 2A.

The light beam LY emitted from the light source unit 202Y is incident on a reflective surface of the rotating polygon mirror 203. The light beam LY is deflected (reflected) toward side A in FIG. 2A by the reflective surface of the rotating polygon mirror 203. The light beam LM emitted from the light source unit 202M is incident on the same reflective surface of the rotating polygon mirror 203 as the reflective surface on which the light beam LY is incident, and is deflected by the reflective surface of the rotating polygon mirror 203 toward the same side (side A) as the side toward which the light beam LY is deflected. Here, side A corresponds to a first direction.

The light beam LBk emitted from the light source unit 202Bk is incident on a reflective surface of the rotating polygon mirror 203 other than the reflective surface on which the light beam LY and the light beam LM are incident. The light beam LBk is deflected (reflected) toward side B in FIG. 2A by the reflective surface of the rotating polygon mirror 203. The light beam LC emitted from the light source unit 202C is incident on the same reflective surface of the rotating polygon mirror 203 as the reflective surface on which the light beam LBk is incident, and is deflected by the reflective surface of the rotating polygon mirror 203 toward the same side (side B) as the side toward which the light beam LBk is deflected. Here, side B corresponds to a second direction.

The light beams LY and LM deflected by the rotating polygon mirror 203 are moved in the positive X-axis direction. In other words, as a result of the deflection by the rotating polygon mirror 203 that rotates, the light beam LY serves as a light beam with which the photoconductor drum 102Y is scanned in the positive X-axis direction, and the light beam LM serves as a light beam with which the photoconductor drum 102M is scanned in the positive X-axis direction.

The light beams LBk and LC deflected by the rotating polygon mirror 203 are moved in the negative X-axis direction. In other words, as a result of the deflection by the rotating polygon mirror 203 that rotates, the light beam LBk serves as a light beam with which the photoconductor drum 102Bk is scanned in the negative X-axis direction, and the light beam LC serves as a light beam with which the photoconductor drum 102C is scanned in the negative X-axis direction. Thus, in the optical scanning apparatus 200, the rotating polygon mirror 203 deflects the light beams emitted from the light source units 202Y, 202M, 202C, and 202Bk toward side A and side B. The optical scanning apparatus 200 is a counter-scanning-type optical scanning apparatus in which the rotating polygon mirror 203 deflects the light beams toward side A and side B so that the photoconductor drums 102Y, 102M, 102C, and 102Bk are irradiated with the light beams.

Next, optical paths of the light beams LY, LM, LC, and LBk deflected by the rotating polygon mirror 203 will be described with reference to FIG. 2B. As illustrated in FIG. 2B, optical members including the rotating polygon mirror 203, lenses 206, 207, 208, 209, 210, and 211, and reflection mirrors 212, 213, 214, 215, 216, and 217 are accommodated in the optical box 201. The optical members including the rotating polygon mirror 203, the lenses 206, 207, 208, 209, 210, and 211, and the reflection mirrors 212, 213, 214, 215, 216, and 217 are arranged on the bottom portion (bottom surface) of the optical box 201. A cover 218 for protecting the rotating polygon mirror 203, the lenses, and the reflection mirrors from dust is attached to the optical box 201 at the open top of the optical box 201.

The light beam LY deflected by the rotating polygon mirror 203 passes through the lenses 206 and 207, and is incident on the reflection mirror 212. The reflection mirror 212 reflects the light beam LY incident thereon toward the photoconductor drum 102Y. The cover 218 has an opening 219 that allows the light beam LY reflected by the reflection mirror 212 to pass therethrough. The opening 219 is covered with a transparent dustproof window 223 that transmits the light beam LY. The light beam LY that has passed through the dustproof window 223 is focused on the photoconductor drum 102Y.

The light beam LM deflected by the rotating polygon mirror 203 passes through the lens 206, and is incident on the reflection mirror 213. The reflection mirror 213 reflects the light beam LM incident thereon toward the reflection mirror 214. The light beam LM reflected by the reflection mirror 213 passes through the lens 208, and is incident on the reflection mirror 214. The reflection mirror 214 reflects the light beam LM incident thereon toward the photoconductor drum 102M. The cover 218 has an opening 220 that allows the light beam LM reflected by the reflection mirror 214 to pass therethrough. The opening 220 is covered with a transparent dustproof window 224 that transmits the light beam LM. The light beam LM that has passed through the dustproof window 224 is focused on the photoconductor drum 102M.

The light beam LBk deflected by the rotating polygon mirror 203 passes through the lenses 209 and 210, and is incident on the reflection mirror 215. The reflection mirror 215 reflects the light beam LBk incident thereon toward the photoconductor drum 102Bk. The cover 218 has an opening 222 that allows the light beam LBk reflected by the reflection mirror 215 to pass therethrough. The opening 222 is covered with a transparent dustproof window 226 that transmits the light beam LBk. The light beam LBk that has passed through the dustproof window 226 is focused on the photoconductor drum 102Bk.

The light beam LC deflected by the rotating polygon mirror 203 passes through the lens 209, and is incident on the reflection mirror 216. The reflection mirror 216 reflects the light beam LC incident thereon toward the reflection mirror 217. The light beam LC reflected by the reflection mirror 216 passes through the lens 211, and is incident on the reflection mirror 217. The reflection mirror 217 reflects the light beam LC incident thereon toward the photoconductor drum 102C. The cover 218 has an opening 221 that allows the light beam LC reflected by the reflection mirror 217 to pass therethrough. The opening 221 is covered with a transparent dustproof window 225 that transmits the light beam LC. The light beam LC that has passed through the dustproof window 225 is focused on the photoconductor drum 102C.

Structure of Leaf Spring (Pressing Member) for Fixing Mirror

Figure 5A:
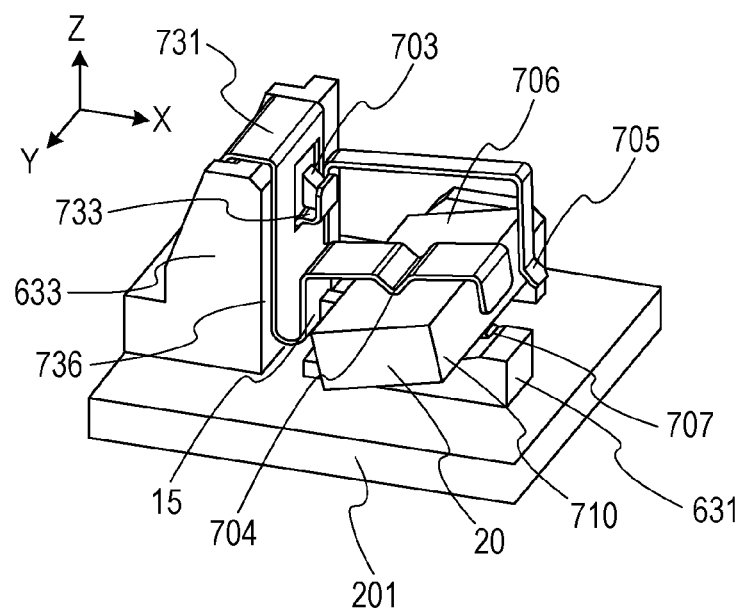
FIGS. 5A and 5B illustrate the manner in which the leaf spring presses an optical component according to the embodiment.
Figure 5B:
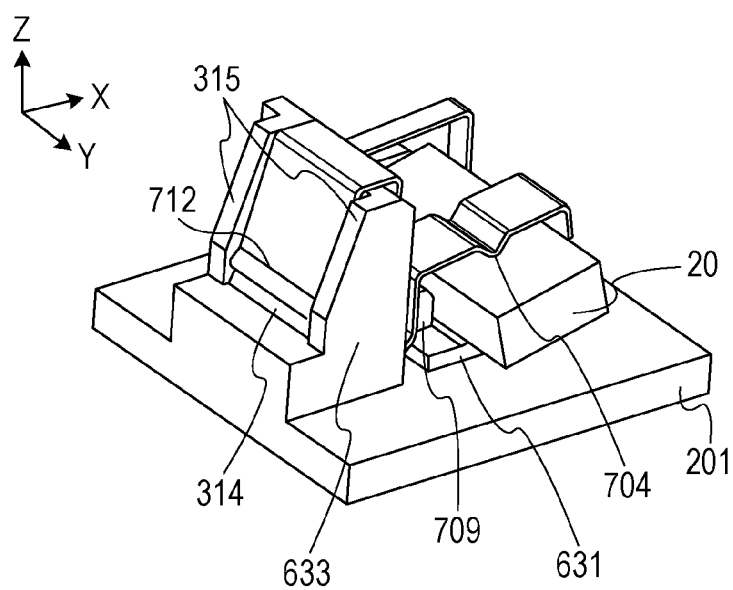

The structure of a leaf spring 702 used to fix a reflection mirror 20 according to the present embodiment will now be described with reference to FIGS. 3A to 5B. FIGS. 3A to 4E illustrate the leaf spring 702 viewed in various directions. FIGS. 5A and 5B illustrate the state in which the leaf spring 702 is attached to the optical box 201 so as to fix the reflection mirror 20 to the optical box 201. The reflection mirror 20 corresponds to the reflection mirrors 214, 217, etc., described with reference to FIGS. 2A and 2B. The leaf spring 702, which is a fixing member, is a component formed by processing a single metal plate. The leaf spring 702 includes a first plate portion 702h. The leaf spring 702 also includes a second plate portion 727, which serves as a third arm, a third plate portion 730, which serves as a second arm, a fourth plate portion 729, which serves as a first arm, and a fifth plate portion 731, all of which are bent with respect to the first plate portion 702h. The first plate portion 702h includes a surface 702a (see FIG. 3C).

The first plate portion 702h is a contact portion that comes into contact with a projecting portion 633 described below (see FIG. 5A), which is a projection, and that receives a repulsive force from the projecting portion 633. The first plate portion 702h and the second plate portion 727 are connected to each other by a U-shaped curved portion 702p. The U-shaped curved portion 702p is formed by bending the second plate portion 727 relative to the first plate portion 702h substantially in a U-shape at an end of the first plate portion 702h. As illustrated in FIG. 3B, the second plate portion 727 extends only from part of the first plate portion 702h that is bent at the U-shaped curved portion 702p, and the remaining part of the first plate portion 702h that is bent at the U-shaped curved portion 702p is cut at a cut portion 727d. The cut portion 727d is provided at an end at which the cut portion 727d opposes the fourth plate portion 729. The reason why the second plate portion 727 is formed so as to extend only from part of the first plate portion 702h that is bent at the U-shaped curved portion 702p and the cut portion 727d is formed is to impart elasticity to the second plate portion 727. The second plate portion 727 extends parallel to the first plate portion 702h from the U-shaped curved portion 702p toward the other end of the first plate portion 702h (toward a bent portion 731a, which will be described below), and then is bent at a substantially right angle at a bent portion 727a so as to extend in a direction away from the first plate portion 702h. Thus, the second plate portion 727 is formed so as to be substantially perpendicular to the first plate portion 702h.

The first plate portion 702h and the third plate portion 730 are connected to each other by the fifth plate portion 731. The fifth plate portion 731 is connected to the first plate portion 702h by the bent portion 731a, and is formed by bending the fifth plate portion 731 at a substantially right angle relative to the first plate portion 702h at the bent portion 731a. The third plate portion 730 is connected to the fifth plate portion 731 by a bent portion 731b, and is formed by bending the third plate portion 730 at a substantially right angle relative to the fifth plate portion 731 at the bent portion 731b. Thus, the first plate portion 702h, the fifth plate portion 731, and the third plate portion 730 form an angular-U-shaped section. The angular-U-shaped section including the first plate portion 702h, the fifth plate portion 731, and the third plate portion 730 is formed so as to clamp the projecting portion 633 provided on the optical box 201, which will be described below, when the leaf spring 702 is moved in the negative Z-axis direction to attach the leaf spring 702 to the optical box 201. The third plate portion 730 includes a V-shaped second pressing portion 712, which projects toward the first plate portion 702h, at a position near an end opposite to the end at which the bent portion 731b is provided. The second pressing portion 712 presses a surface 314 (see FIG. 5B) of the projecting portion 633 provided on the optical box 201, which will be described below.

The thin plate shaped first plate portion 702h has the surface 702a at one side thereof. The surface 702a comes into contact with a spring-receiving surface 736 (see FIG. 5A) of the projecting portion 633 provided on the optical box 201, and serves as a reference for the position of the leaf spring 702. The second plate portion 727 includes a third pressing portion 704, which presses a mirror reflective surface 706 (see FIG. 5A) of the reflection mirror 20. The third pressing portion 704 is a V-shaped portion that is bent so as to project in the negative Z-axis direction at a position around the center of the second plate portion 727. The second plate portion 727 also includes an end portion 727c at an end opposite to the end at which the bent portion 727a is provided. The end portion 727c is bent at a substantially right angle at a bent portion 727b so as to extend in the negative Z-axis direction. When the second plate portion 727 and the first plate portion 702h, which are connected to each other by the U-shaped curved portion 702p, of the leaf spring 702 are inserted into a space between the reflection mirror 20 and the projecting portion 633, the third pressing portion 704 comes into contact with the mirror reflective surface 706 of the reflection mirror 20. The mirror reflective surface 706 is a surface of the reflection mirror 20 on which a light beam is incident. The third pressing portion 704 presses the reflection mirror 20 against a first mirror seat 707, which serves as a second contact portion, of a mirror support 631, which serves as an optical member supporting portion (see FIGS. 5A and 5B). The first mirror seat 707 comes into contact with a second surface of the reflection mirror 20 that is parallel to the mirror reflective surface 706. In this state, the end portion 727c of the second plate portion 727 is not in contact with a mirror flat surface 710, which is a surface of the reflection mirror 20 that is parallel to a surface of the reflection mirror 20 that is pressed against a second mirror seat 709, which will be described below, but opposes the mirror flat surface 710. Thus, the end portion 727c prevents the reflection mirror 20 from moving in the positive X-axis direction and becoming separated from the mirror support 631.

The third plate portion 730 is formed by being bent, with the fifth plate portion 731 provided between the third plate portion 730 and the first plate portion 702h, at an end of the first plate portion 702*h* at which the bent portion 731*a* is provided. The third plate portion 730 is bent toward a side opposite to a side toward which the fourth plate portion 729 and the second plate portion 727 are bent. The third plate portion 730 includes the second pressing portion 712, which presses the surface 314 of the projecting portion 633 provided on the optical box 201 when the leaf spring 702 is attached to the optical box 201. The second pressing portion 712 is a V-shaped portion that is bent so as to project toward the first plate portion 702*h* at an end of the third plate portion 730 of the leaf spring 702 opposite to the end at which the bent portion 731*b* is provided.

Fourth Plate Portion

The fourth plate portion 729 includes a portion of the first plate portion 702*h* at an end at which the U-shaped curved portion 702*p* is provided, and is formed by being bent from a central section of the first plate portion 702*h* at a substantially right angle so as to extend in the positive X-axis direction. More specifically, the fourth plate portion 729 is formed by bending a side portion of the first plate portion 702*h* in the negative Y-axis direction at a substantially right angle at a bent portion 729*a* toward a side opposite to the side toward which the third plate portion 730 is bent (positive side in the X-axis direction). A slit 729*s* is formed in the first plate portion 702*h* to impart elasticity to the fourth plate portion 729, and a portion of the first plate portion 702*h* on the negative side of the slit 729*s* in the Y-axis direction constitutes a portion of the fourth plate portion 729. The fourth plate portion 729 is also bent at a substantially right angle at a bent portion 729*b*, and is angular-U shaped. The fourth plate portion 729 includes a first pressing portion 705, which presses the reflection mirror 20, at an end opposite to an end that is adjacent to the first plate portion 702*h*. The first pressing portion 705, which serves as a pressing portion, is a V-shaped portion that is formed by bending an end portion of the fourth plate portion 729 in a direction away from the first plate portion 702*h* (positive X-axis direction). The first pressing portion 705 comes into contact with the mirror flat surface 710, which is a predetermined surface of the reflection mirror 20 (see FIG. 5A). Thus, the first pressing portion 705 elastically presses the reflection mirror 20 against the second mirror seat 709, which is a first contact portion of the mirror support 631, which serves as an optical member supporting portion. Thus, the fourth plate portion 729 extends from the projecting portion 633 such that the fourth plate portion 729 overlaps the reflection mirror 20 but is not in contact with the reflection mirror 20, and the first pressing portion 705 presses the mirror flat surface 710, which does not face the first plate portion 702*h*, toward the projecting portion 633. The second mirror seat 709 comes into contact with a first surface of the reflection mirror 20, which is a surface parallel to the mirror flat surface 710 (surface opposite to the first surface).

Hole

A hole 713 is an opening formed in the surface 702*a* so as to extend through the first plate portion 702*h* in the front-back direction. The hole 713 may instead be a recess. A portion of the first plate portion 702*h* that used to cover the hole 713 serves as an engagement portion 733 (engagement portion provided on the leaf spring) that engages with an engagement portion 703 on the projecting portion 633 (engagement portion provided on the housing). Thus, the first plate portion 702*h* is provided with the engagement portion 733, which serves as an engagement portion provided on the leaf spring. When the engagement portion 703 provided on the optical box 201 engages with the engagement portion 733 provided on the leaf spring 702, the leaf spring 702 is positioned in the Z-axis direction.

Thus, the leaf spring 702 is configured such that the engagement portion 733 provided on the leaf spring 702 engages with the engagement portion 703 provided on the optical box 201. Therefore, the leaf spring 702 is prevented from being separated from the optical box 201 by the repulsive force applied by the reflection mirror 20, and the position of the leaf spring 702 may be maintained. More specifically, in a first state in which the engagement portion 703 provided on the optical box 201 is engaged with the engagement portion 733, the first pressing portion 705 and the third pressing portion 704 press the reflection mirror 20 so that the reflection mirror 20 is urged against the mirror support 631, which will be described below. Although reference numerals of many portions of the leaf spring 702 are shown in FIGS. 3A to 4E, some of the reference numerals are omitted in other drawings to improve visibility.

In the state in which the reflection mirror 20 is fixed to the optical box 201, owing to the reactive force applied to the third pressing portion 704 of the leaf spring 702 by the reflection mirror 20, the leaf spring 702 receives a rotation moment around an axis that is parallel to the Y-axis and passes through the engagement portion 733. To suppress the rotation around the axis parallel to the Y-axis, a surface 15 of the second plate portion 727 of the leaf spring 702 abuts against the second mirror seat 709 (see FIG. 5A). When the surface 15 (see FIG. 3A) of the second plate portion 727 of the leaf spring 702 abuts against the second mirror seat 709, the leaf spring 702 is positioned in the X-axis direction (direction orthogonal to the longitudinal direction).

Figure 6:
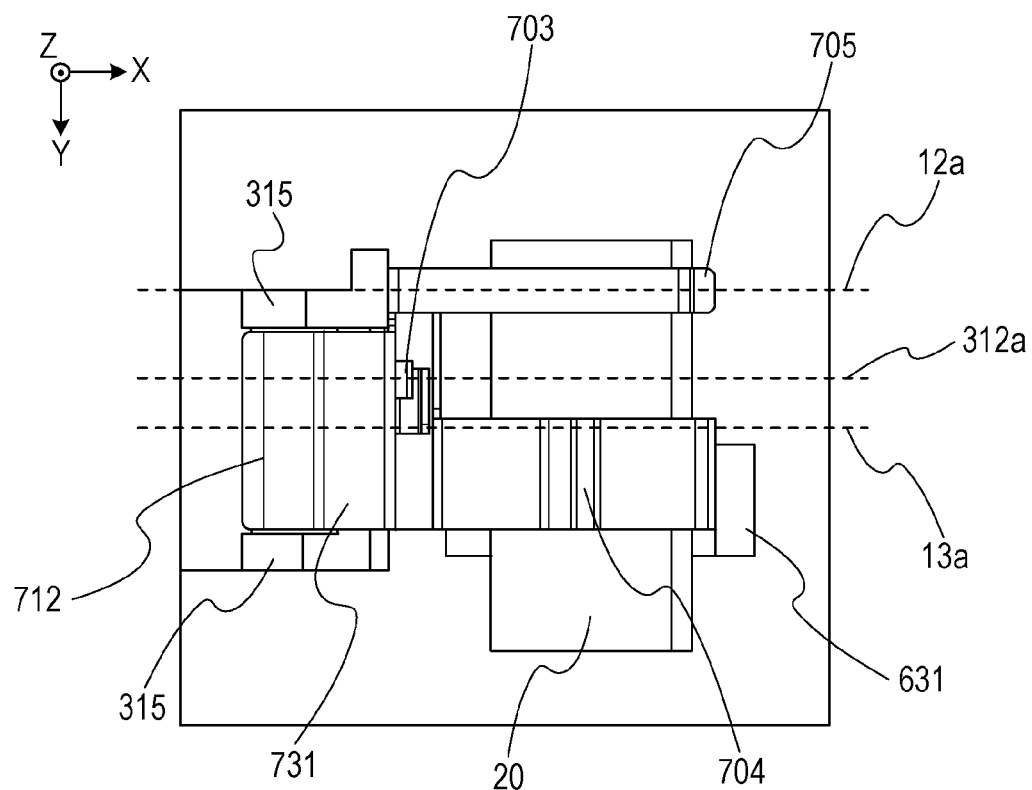
FIG. 6 illustrate the positional relationship between portions of the leaf spring according to the embodiment.
Figure 9C:
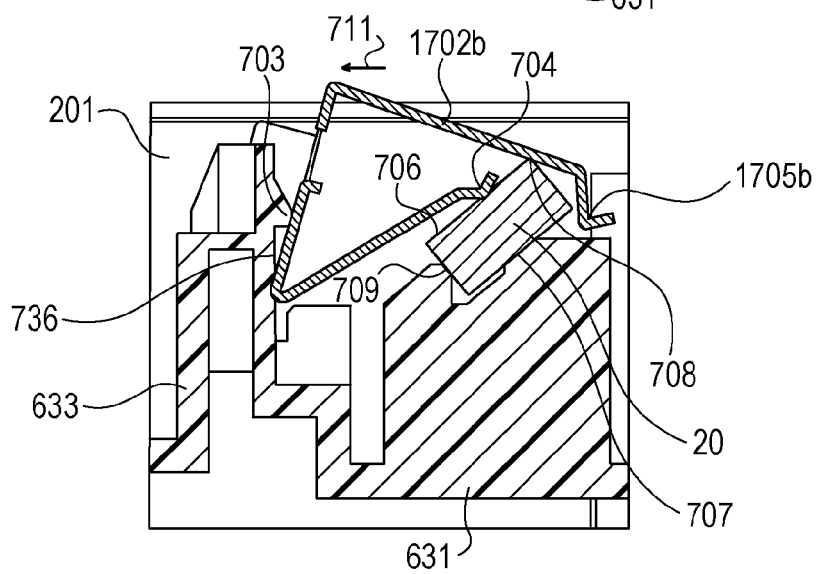

FIG. 6 is a diagram of the structure illustrated in FIGS. 5A and 5B viewed from above (positive side) in the Z-axis direction, and illustrates the positional relationship between the third pressing portion 704, the first pressing portion 705, the second pressing portion 712, and the engagement portion 703 in the Y-axis direction. The dashed lines that are parallel to the X-axis direction and pass through the centers of the components other than the third pressing portion 704 in the Y-axis direction are a first pressing portion center 12*a*, a second pressing portion center 13*a*, and an engagement portion center 312*a*. In the present embodiment, the first pressing portion center 12*a*, the engagement portion center 312*a*, and the second pressing portion center 13*a* are arranged in that order in the positive Y-axis direction. In other words, the fourth plate portion 729 and the third plate portion 730 are arranged such that the engagement portion 703 (312*a*) is positioned between the fourth plate portion 729 and the third plate portion 730 in the longitudinal direction of the reflection mirror 20 (Y-axis direction). Accordingly, when the state of the leaf spring 702 is changed to above-described first state from a second state, in which the engagement portion 703 provided on the optical box 201 is not engaged with the engagement portion 733, the leaf spring 702 comes into contact with the engagement portion 703 and rotates such that the engagement portion 703 serves as a fulcrum. In the present embodiment, components corresponding to those of the related art illustrated in FIGS. 9A to 9C are denoted by the same reference numerals.

Structures of Spring Support and Mirror Support

As illustrated in FIGS. 5A and 5B, the projecting portion 633, which supports the leaf spring 702, and the mirror support 631, which supports the reflection mirror 20 so that the reflection mirror 20 may be accurately attached to the optical box 201, are formed integrally with the optical box 201 on the inner side thereof. The projecting portion 633 also serves as a gap-forming portion that provides a gap between the projecting portion 633 and the reflection mirror 20 supported by the mirror support 631, which will be described below. The projecting portion 633 includes two ribs 315, which serve as rib portions that project in the negative X-axis direction at both sides of the projecting portion 633 in the Y-axis direction. When the leaf spring 702 is being attached, the third plate portion 730 of the leaf spring 702 is moved in the negative Z-axis direction while being in contact with the surface 314, which is a recessed surface between the two ribs 315. Thus, the leaf spring 702 is positioned in the Y-axis direction. Accordingly, the distance between the two ribs 315 of the projecting portion 633 in the Y-axis direction is set so as to be greater than the length of the third plate portion 730 of the leaf spring 702 in the Y-axis direction. When the leaf spring 702 engages with the engagement portion 703 provided on the optical box 201, the spring-receiving surface 736 of the projecting portion 633 comes into contact with the surface 702a of the leaf spring 702.

The mirror support 631 includes the first mirror seat 707 and second mirror seat 709 to which the reflection mirror 20 comes into contact when the reflection mirror 20 is pressed by the third pressing portion 704 and the first pressing portion 705 of the leaf spring 702. The first mirror seat 707 supports a surface of the reflection mirror 20 that is opposite to the mirror reflective surface 706 at a position corresponding to the position at which the reflection mirror 20 is pressed by the third pressing portion 704 of the leaf spring 702. Although not illustrated, a mirror support similar to the mirror support 631 is provided at the other end of the reflection mirror 20 in the longitudinal direction (Y-axis direction), and the reflection mirror 20 is supported at both ends thereof, as illustrated in FIG. 2A. Components corresponding to those of the related art illustrated in FIGS. 9A to 9C are denoted by the same reference numerals.

Attachment of Leaf Spring to Optical Box

Figure 7E:
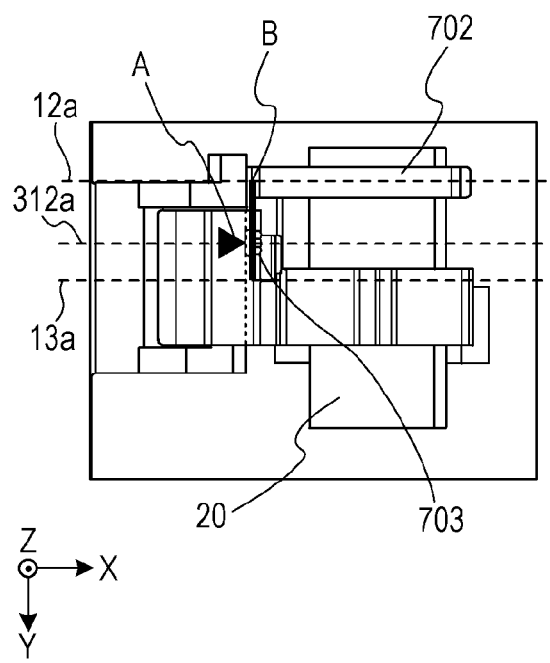

FIGS. 7A to 7F illustrate the steps of a process of attaching the leaf spring 702 to the optical box 201. The upper parts of FIGS. 7A to 7D illustrate the manner in which the leaf spring 702 is attached to the optical box 201 viewed from the positive side in the Z-axis direction (from above), and the lower parts of FIGS. 7A to 7D are perspective views illustrating the manner in which the leaf spring 702 is attached to the optical box 201 viewed from the positive side in the Y-axis direction (from the side). First, as illustrated in FIG. 7A, the attachment process is started by moving the leaf spring 702 in the direction shown by the arrow (negative Z-axis direction) from the positive side of the Z-axis direction (from above) toward the reflection mirror 20 that is supported by the mirror support 631 provided on the optical box 201. Then, as illustrated in FIG. 7B, when the leaf spring 702 is moved to a certain position in the negative Z-axis direction (downward), the surface 702a of the leaf spring 702 comes into contact with the engagement portion 703 provided on the optical box 201. When the leaf spring 702 is further moved in the negative Z-axis direction (downward) while the leaf spring 702 is in contact with the engagement portion 703, the leaf spring 702 is rotated in the direction shown by the arrow such that the engagement portion 703 serves as a fulcrum (center of rotation), and is tilted. In other words, the leaf spring 702 is rotated clockwise around an axis that passes through the engagement portion 703 and that is parallel to the Z-axis, and is tilted.

As illustrated in FIG. 7C, when the leaf spring 702 is further moved downward in the Z-axis direction, the surface 15 of the leaf spring 702 comes into contact with a surface of the second mirror seat 709 that faces the projecting portion 633. Thus, the leaf spring 702 is positioned in the X-axis direction. In other words, the U-shaped curved portion 702p of the leaf spring 702 is inserted into the gap between the projecting portion 633 and the mirror support 631, so that the leaf spring 702 is positioned in the X-axis direction.

As illustrated in FIG. 7D, when the leaf spring 702 is further moved downward in the Z-axis direction, the surface 702a of the leaf spring 702 moves over the engagement portion 703 provided on the optical box 201, and the engagement portion 703 is received by the hole 713 formed in the surface 702a, so that the engagement portion 703 projects from the hole 713. Thus, the engagement portion 703 provided on the optical box 201 engages with the engagement portion 733 provided on the leaf spring 702. When the engagement portion 703 provided on the optical box 201 engages with the engagement portion 733 provided on the leaf spring 702, the surface 702a is pressed against the spring-receiving surface 736 of the optical box 201 by the reactive force of the pressing force generated by the second pressing portion 712 of the leaf spring 702. Thus, the process of attaching the leaf spring 702 to the optical box 201 is completed.

Mechanism That Rotates Leaf Spring

Figure 7F:
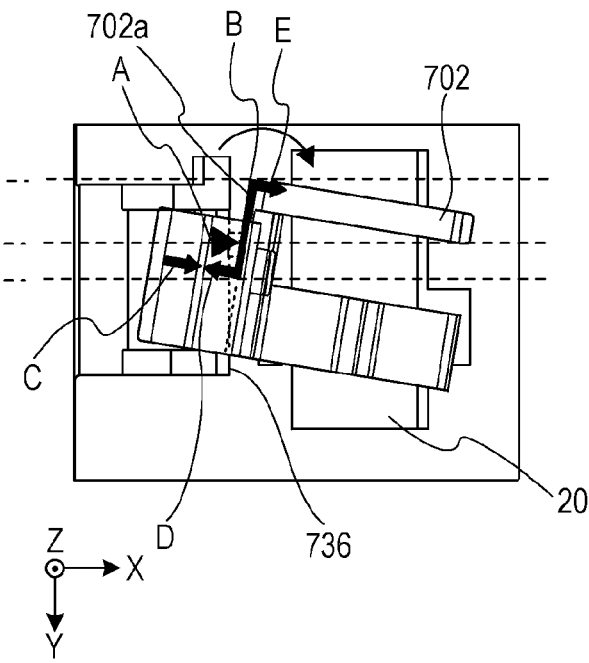

FIGS. 7E and 7F are diagrams illustrating the movement of the leaf spring 702 when the leaf spring 702 is attached to the optical box 201 as illustrated in FIGS. 7A to 7D. FIG. 7E illustrates the same state as the state illustrated in FIG. 7A, and FIG. 7F illustrates the same state as the state illustrated in FIG. 7C. For simplicity, FIGS. 7E and 7F illustrate a fulcrum A and a beam B. The positional relationship between the first pressing portion 705, the engagement portion 703, and the second pressing portion 712 in the Y-axis direction is the same as that illustrated in FIG. 6. The dashed lines in FIGS. 7E and 7F show the first pressing portion center 12a, the engagement portion center 312a, and the second pressing portion center 13a. The fulcrum A is on the engagement portion center 312a. The beam B is on the surface 702a, with one end thereof being on the first pressing portion center 12a and the other end thereof being on the second pressing portion center 13a.

As illustrated in FIG. 7C, when the leaf spring 702 is attached to the optical box 201, the second pressing portion 712 comes into contact with the optical box 201, and a force C that presses the optical box 201 (hereinafter referred to as a pressing force) is generated, as illustrated in FIG. 7F. The pressing force C is a force applied by the leaf spring 702 (second pressing portion 712) to press the optical box 201 (surface 314 of the projecting portion 633). As a result, based on the principle of action and reaction, the beam B receives a force D that is equivalent to the pressing force C (hereinafter referred to as a reactive force). The reactive force D is a force that the leaf spring 702 (surface 702a, more specifically, the beam B) receives from the optical box 201 (spring-receiving surface 736 of the projecting portion 633). The reactive force D and the pressing force C are forces having the same magnitude and applied in the opposite directions. Since the beam B is in contact with the engagement portion 703, the reactive force D serves as the point of application, and the beam B rotates clockwise such that the engagement portion 703 serves as a fulcrum. As a result, the other end of the beam B (denoted by E in FIG. 7F), which serves as a point of load, rotates clockwise around the engagement portion 703. In the present embodiment, owing to the relationship between the fulcrum, the point of application, and the point of load, the leaf spring 702 (that is, the first pressing portion 705) rotates when the leaf spring 702 is attached to the optical box 201.

Figure 8A:
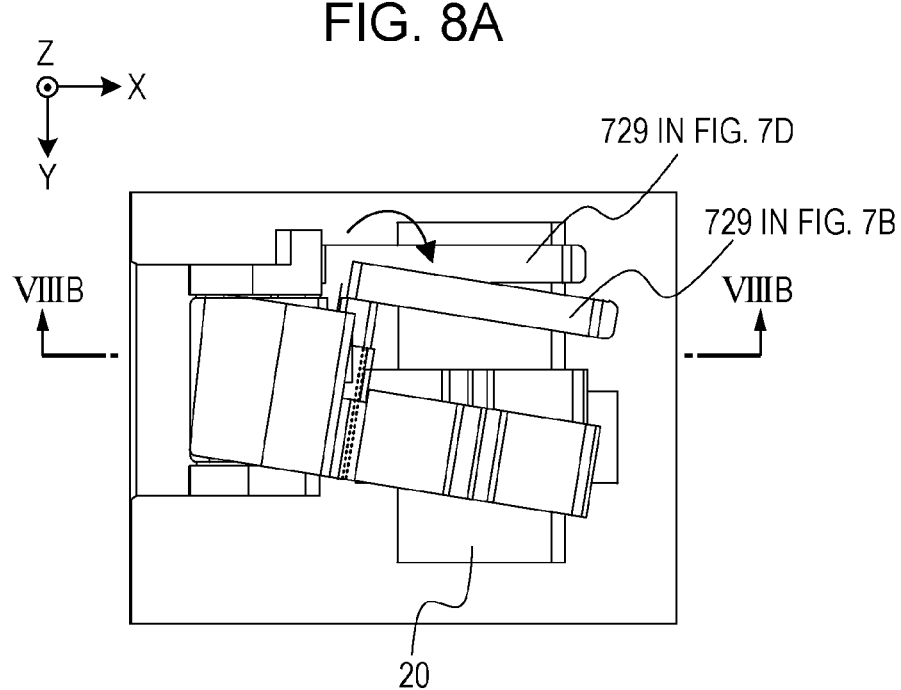
FIGS. 8A and 8B illustrate the state in which the leaf spring is rotated away from the optical component.
Figure 8B:
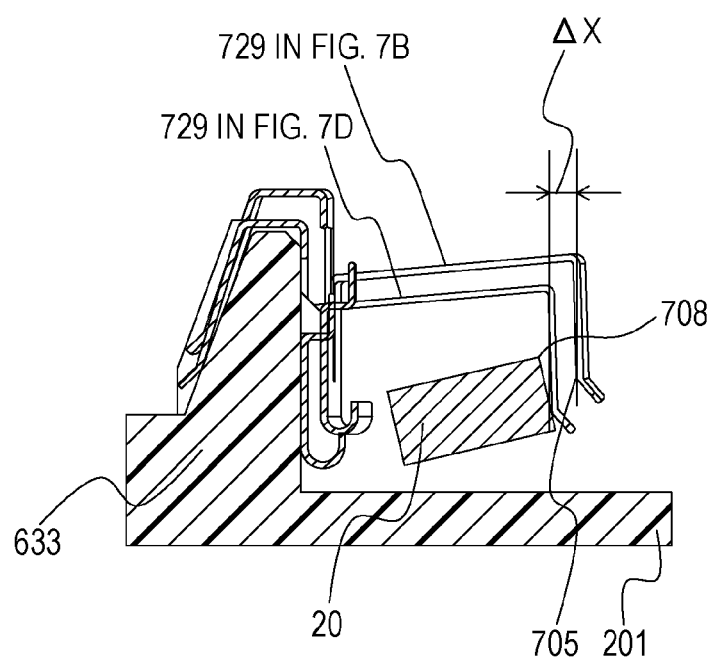

Positional Relationship Between Second Pressing Portion and Reflection Mirror During Attachment of Leaf Spring FIGS. 8A and 8B illustrate the leaf spring 702 illustrated in FIG. 7B and the leaf spring 702 illustrated in FIG. 7D in an overlapping manner. FIG. 8A illustrates a view from the positive side in the Z-axis direction, and FIG. 8B is a sectional view of FIG. 8A taken along line VIIIB-VIIIB viewed from the positive side in the Y-axis direction. As a result of the above-described rotation of the leaf spring 702, as illustrated in FIG. 8A, the leaf spring 702, that is, the fourth plate portion 729, rotates clockwise around the fulcrum A (see FIGS. 7A and 7B). When the fourth plate portion 729 rotates, the first pressing portion 705 also rotates. As illustrated in FIG. 8B, the position of the first pressing portion 705 of the leaf spring 702 in the X-axis direction is moved in a direction away from the reflection mirror 20 by ΔX in response to the rotation of the leaf spring 702. In other words, as a result of the rotation of the leaf spring 702, the first pressing portion 705 of the leaf spring 702 is separated from a mirror edge portion 708 of the reflection mirror 20 by ΔX. Therefore, when the leaf spring 702 is being attached to the optical box 201, the first pressing portion 705 of the leaf spring 702 does not come into contact with the mirror edge portion 708 of the reflection mirror 20.

As described above, according to the present embodiment, the first pressing portion 705 and the second pressing portion 712 of the leaf spring 702 and the engagement portion 703 provided on the optical box 201 are arranged to have the above-described positional relationship. Therefore, in the present embodiment, chipping of the mirror edge portion 708 of the reflection mirror 20 does not occur due to the leaf spring 702 when the leaf spring 702 is being attached to the optical box 201. In the present embodiment, the leaf spring 702 is used to press the reflection mirror 20. However, the leaf spring 702 may instead be used as a member for pressing, for example, a lens or a glass component. Thus, the object to be pressed by the leaf spring is not limited to a reflective mirror.

In the present embodiment, the engagement portion 703 has both a function of becoming engaged with the engagement portion 733 to prevent the reflection mirror 20 from being released from the state in which the reflection mirror 20 is pressed by the first pressing portion 705 and a function of temporarily tilting the leaf spring 702 when the leaf spring 702 is attached to the optical box 201. However, the present embodiment is not limited to this. More specifically, a projection corresponding to the engagement portion 703 may be provided, the projection being formed such that the projection does not have the function of preventing the reflection mirror 20 from being released from the state in which the reflection mirror 20 is pressed by the first pressing portion 705 but has a function of temporarily tilting the leaf spring 702 when the leaf spring 702 is attached to the optical box 201.

In addition, according to the present embodiment, the mechanism for fixing the reflection mirror is included in an optical scanning apparatus. However, the present embodiment is not limited to this. For example, the fixing mechanism according to the above-described embodiment may be used as a mechanism for fixing an optical member in, for example, a document reading apparatus or a scanner attached to an image forming apparatus.

According to the above-described embodiment, the occurrence of chipping or cracking of an optical member may be reduced in a period from start to completion of a process of attaching a leaf spring at a predetermined location.

Thus, according to an aspect of the present invention, the occurrence of chipping or cracking of an optical member may be reduced in a period from start to completion of a process of attaching a leaf spring at a predetermined location.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-064483 filed Mar. 26, 2014, which is hereby incorporated by reference herein in its entirety.

What is claimed is:

1. An optical scanning apparatus comprising:
    a light source configured to emit a light beam;
    a deflector configured to deflect the light beam emitted from the light source so that a photoconductor is scanned with the light beam;
    an optical member configured to guide the light beam deflected by the deflector to the photoconductor;
    a housing configured to accommodate the deflector, and the optical member and including an engagement portion and an optical member supporting portion configured to support the optical member; and
    a leaf spring including:
        a pressing portion configured to press the optical member supported by the optical member supporting portion,
        an engagement portion configured to engage with the engagement portion provided on the housing, the pressing portion presses the optical member so that the optical member is urged against the optical member supporting portion in a first state in which the engagement portion provided on the leaf spring is engaged with the engagement portion provided on the housing,
        a plate portion on which the engagement portion provided on the leaf spring is formed,
        a first arm including the pressing portion as a first pressing portion, the first arm further including a first end of the plate portion and being bent at a central section of the plate portion, and
        a second arm including a second pressing portion, the second arm being bent from the plate portion at a second end of the plate portion toward a side opposite to a side toward which the first arm is bent,
        wherein the first arm and the second arm are formed such that the engagement portion provided on the housing is located between the first arm and the second arm in a longitudinal direction of the optical member;
    wherein, when a state of the leaf spring is being changed to the first state from a second state in which the engagement portion provided on the leaf spring is not engaged with the engagement portion provided on the housing, the leaf spring comes into contact with the engagement portion provided on the housing and rotates such that the engagement portion provided on the housing functions as a fulcrum.

2. The optical scanning apparatus according to claim 1, wherein the optical member supporting portion includes a first contact portion that is in contact with a first surface of the optical member and a second contact portion that is in contact with a second surface of the optical member, the first contact portion and the second contact portion supporting the optical member, wherein the leaf spring further includes a third arm that includes a third pressing portion and that is bent at the first end of the plate portion, and wherein the first pressing portion and the third pressing portion press the optical member so as to urge the optical member against the first contact portion and the second contact portion.

3. The optical scanning apparatus according to claim 2, wherein the first pressing portion presses a surface of the optical member that is opposite to the first surface, wherein the optical member is urged against the first contact portion when the first pressing portion presses the surface of the optical member that is opposite to the first surface, wherein the third pressing portion presses a surface of the optical member that is opposite to the second surface, and wherein the optical member is urged against the second contact portion when the third pressing portion presses the surface of the optical member that is opposite to the second surface.

4. The optical scanning apparatus according to claim 1, comprising:

a leaf spring support that includes the engagement portion provided on the housing and supports the leaf spring, wherein, when the state of the leaf spring is being changed from the second state to the first state, the second pressing portion presses the leaf spring support.

5. The optical scanning apparatus according to claim 4, wherein the leaf spring support includes rib portions at both sides of a surface of the leaf spring support in a longitudinal direction of the optical member, the surface of the leaf spring support being pressed by the second pressing portion, and wherein the leaf spring is positioned in the longitudinal direction when the second arm is inserted into a space between the rib portions at both sides of the surface of the leaf spring support.

6. The optical scanning apparatus according to claim 1, wherein the engagement portion provided on the housing is arranged so that a gap is provided between the engagement portion provided on the housing and the optical member supported by the optical member supporting portion, and the leaf spring is positioned in a direction orthogonal to a longitudinal direction of the optical member when a portion of the leaf spring is inserted into the gap.

7. The optical scanning apparatus according to claim 1, wherein the leaf spring is positioned in a direction perpendicular to a bottom surface of the housing when the engagement portion provided on the leaf spring engages with the engagement portion provided on the housing.

8. The optical scanning apparatus according to claim 1, wherein the optical member is a reflection mirror that is made of glass and that reflects the light beam.

9. The optical scanning apparatus according to claim 1, wherein the housing is made of a resin.

10. An optical scanning apparatus comprising:

a light source configured to emit a light beam;

a deflector configured to deflect the light beam emitted from the light source so that a photoconductor is scanned with the light beam;

an optical member configured to guide the light beam deflected by the deflector to the photoconductor;

a housing configured to accommodate the deflector, and the optical member and including a projecting portion and an optical member supporting portion configured to support the optical member, the projecting portion includes a surface along a longitudinal direction of the optical member and provided with an engagement portion, the supporting portion is disposed between the engagement portion and the optical member supported by the supporting portion; and a leaf spring including:

a pressing portion configured to press the optical member to the supporting portion, and a plate portion configured to contact the surface and provided with an engagement portion which is engaged with the engagement portion provided on the housing, wherein the engaging portion and the pressing portion provided to the leaf spring are arranged at a same side with respect to a center of the plate in the longitudinal direction, and wherein the engage portion provided to the leaf spring is positioned between the center of the plate and the pressing member with respect to the longitudinal direction.

* * * * *